United States Patent [19]
Morita et al.

[11] Patent Number: 5,872,906
[45] Date of Patent: Feb. 16, 1999

[54] METHOD AND APPARATUS FOR TAKING COUNTERMEASURE FOR FAILURE OF DISK ARRAY

[75] Inventors: Hirofumi Morita; Keiichi Yorimitsu, both of Kawasaki, Japan

[73] Assignee: Fujitsu Limited, Kawasaki, Japan

[21] Appl. No.: 690,595

[22] Filed: Jul. 31, 1996

Related U.S. Application Data

[63] Continuation of Ser. No. 253,365, Jun. 3, 1994, abandoned.

[30] Foreign Application Priority Data

Oct. 14, 1993 [JP] Japan .................................. 5-256217

[51] Int. Cl.⁶ .................................................. G06F 11/20
[52] U.S. Cl. ................................ 395/182.04; 395/182.05
[58] Field of Search ........................ 395/182.04, 182.05; 371/10.2, 10.3, 40.11, 40.2, 40.3, 40.4; 711/114

[56] References Cited

U.S. PATENT DOCUMENTS 5,258,984  11/1993  Menon et al. ......................... 371/10.1
5,301,297   4/1994  Menon et al. .......................... 395/425
5,303,244   4/1994  Watson ................................. 371/10.1
5,367,669  11/1994  Holland et al. ......................... 395/575

FOREIGN PATENT DOCUMENTS 188463   7/1992  Japan ............................. 395/182.04
279924  10/1992  Japan ............................. 395/182.04
035413   2/1993  Japan ............................. 395/182.04
340619  11/1993  Japan ............................. 395/182.04

Primary Examiner—Robert W. Beausoliel, Jr.
Assistant Examiner—Scott T. Baderman
Attorney, Agent, or Firm—Greer, Burns, & Crain, Ltd.

[57] ABSTRACT

The spare disk unit existing in the port other than the parity group to which a failure disk unit in a disk array belongs is most preferentially selected as an alternative destination and data is reconstructed. When a system is made operative, the spare disk unit is allocated to a different port position every rank and the spare disk unit belonging to the rank of the failure disk unit is most preferentially selected as an alternative destination. Due to this, the selection of the alternative destination by the spare disk unit is optimized and the deterioration of performance in data reconstruction is prevented.

12 Claims, 15 Drawing Sheets

F I G. 7
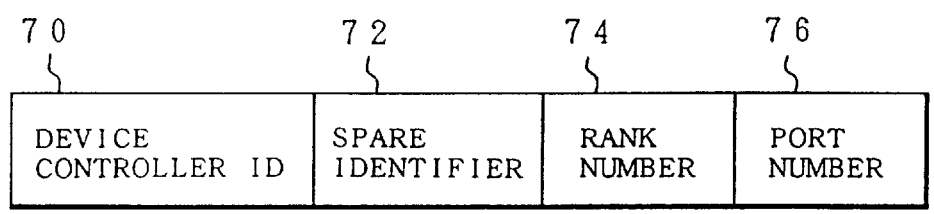

| DEVICE NO. | DEVICE MANAGEMENT INFORMATION | |
|---|---|---|
| 0 0 | 0 0 0 0 | |
| 0 1 | 1 0 0 1 | |
| 0 2 | 2 0 0 2 | RANK R0 |
| 0 3 | 3 0 0 3 | |
| 0 4 | 4 0 0 4 | |
| 0 5 | 5 1 0 5 | ← SPARE DISK |
| 1 0 | 0 0 1 0 | |
| 1 1 | 1 0 1 1 | |
| 1 2 | 2 0 1 2 | RANK R1 |
| 1 3 | 3 0 1 3 | |
| 1 4 | 4 1 1 4 | ← SPARE DISK |
| 1 5 | 5 0 1 5 | |
| 2 0 | 0 0 2 0 | |
| 2 1 | 1 0 2 1 | |
| 2 2 | 2 0 2 2 | ← ERROR DISK |
| 2 3 | 3 0 2 3 | RANK R2 |
| 2 4 | 4 0 2 4 | |
| 2 5 | 5 0 2 5 | |

| DEVICE NO. | DEVICE MANAGEMENT INFORMATION | |
|---|---|---|
| 0 0 | 0 0 0 0 | |
| 0 1 | 1 0 0 1 | |
| 0 2 | 2 0 0 2 | RANK R0 |
| 0 3 | 3 0 0 3 | |
| 0 4 | 4 1 0 4 | ← SPARE DISK |
| 0 5 | 5 0 0 5 | |
| 1 0 | 0 1 1 0 | ← SPARE DISK |
| 1 1 | 1 0 1 1 | |
| 1 2 | 2 0 1 2 | RANK R1 |
| 1 3 | 3 0 1 3 | |
| 1 4 | 4 0 1 4 | |
| 1 5 | 5 0 1 5 | |
| 2 0 | 0 0 2 0 | |
| 2 1 | 1 0 2 1 | |
| 2 2 | 2 0 2 2 | ← ERROR DISK |
| 2 3 | 3 0 2 3 | RANK R2 |
| 2 4 | 4 0 2 4 | |
| 2 5 | 5 0 2 5 | |

FIG. 14

| LOGIC DEVICE | RANK | PRIORITY ORDER 0 | PRIORITY ORDER 1 | PRIORITY ORDER 2 | PRIORITY ORDER 3 |
|---|---|---|---|---|---|
| 0 | 0 | 0 5 | 1 4 | 2 3 | 3 2 |
| 1 | 1 | 1 4 | 2 3 | 3 2 | 0 5 |
| 2 | 1 | 1 4 | 2 3 | 3 2 | 0 5 |
| 3 | 1 | 1 4 | 2 3 | 3 2 | 0 5 |
| 4 | 2 | 2 3 | 3 2 | 0 5 | 1 4 |
| 5 | 2 | 2 3 | 3 2 | 0 5 | 1 4 |
| 6 | 3 | 3 2 | 0 5 | 1 4 | 2 3 |
| 7 | 3 | 3 2 | 0 5 | 1 4 | 2 3 |

60

METHOD AND APPARATUS FOR TAKING COUNTERMEASURE FOR FAILURE OF DISK ARRAY

This application is a continuation of application Ser. No. 08/253,365 filed on Jun. 3, 1994, now abandoned.

BACKGROUND OF THE INVENTION

The present invention relates to a disk array for accessing a plurality of disk units in parallel and for reading or writing data and, more particularly, to method and apparatus for taking a countermeasure of a disk array, wherein at the time of a disk failure, a spare disk unit is allocated and alternated.

The disk array accomplishes a high performance or a high reliability by combining in parallel a plurality of disk units each of which has been processed as a single physical device and by simultaneously making those disk units operative.

In order to enable data to be reconstructed at the time of a disk failure by providing a redundancy disk unit, it is important to allocate the spare disk unit on the alternative destination side of the failure disk unit. At the same time, it is required to properly allocate the spare disk unit so as not to deteriorate the performance of the disk array.

FIG. 1 shows a schematic diagram of a conventional disk array. A disk array 28 is connected as an input/output (I/O) subsystem to a host computer 10 under the domination of a controller 12. Physical positions of a plurality of disk units 30-00 to 30-35 provided in the disk array 28 are specified by ports P0 to P5 and ranks RO to R3. The ports P0 to P5 denote the device interfaces to which parallel input and output are executed from/to the controller 12. The ranks R0 to R3 denote the numbers of arrangement stages in the port direction of the plurality of disk units connected to the ports P0 to P5. The plurality of disk units 30-00 to 30-35 provided in the disk array 28 are constructed by: data disk units to store data; disk units to store parity data as redundancy data; and standby disk units as spare disk units. One parity group is constructed by every five disk units 30-00 to 30-04, 30-10 to 30-14, 30-20 to 30-24, and 30-30 to 30-34 of the ranks R0 to R3 provided for the ports P0 to P5, respectively. When considering a parity group 56 of the rank R0 as an example, in the operating format of RAID3, four disk units 30-00 to 30-03 are used for data and the remaining one disk unit 30-04 is used for parity. In the operating format of RAID5, the position of the disk unit for parity changes every sector. For example, the spare disk units 30-05, 30-15, 30-25, and 30-35 are allocated to the respective ranks R0 to R3 in which five data disk units and are parity disk unit are included.

SUMMARY OF THE INVENTION

Fundamentally, the following four methods were considered by the inventors as methods of allocating the spare disk units in the disk array.

I) Method whereby the disk array has the spare disk unit every rank

II) Method whereby the spare disk units are commonly used by a plurality of ranks III) Method whereby the positions of the spare disk units are fixed IV) Method whereby the positions of the spare disk units are movable A flowchart of FIG. 2 shows an error recovery process in the case where the spare disk unit was allocated every rank. For example, when it is now assumed that a failure occurred in the disk unit 30-02 of the rank R0 in FIG. 1, the spare disk unit 30-05 which is fixedly determined to the same rank R0 is selected in step S1. In step S2, a check is subsequently made to see if the spare disk unit 30-05 can be used or not. If YES, in step S3, the data of the failure disk 30-02 is reconstructed by a construction method and stored into the selected spare disk unit 30-05. That is, the data of the failure device is reconstructed by the other normal disk units 30-00, 30-01, 30-03, and 30-04 in the same parity group as that of the failure disk unit 30-02 and is written into the spare disk unit 30-05. After completion of the data reconstruction, in step S4, the spare disk unit 30-05 is set to the alternative destination of the failure disk unit 30-02 and the operating mode is shifted to the normal operating mode. During this period of time, the failure disk unit 30-02 is exchanged and repaired, thereby recovering. The process after recovery differs in dependence on the method whereby the positions of the spare disk units are fixed and the method whereby they are movable. According to the method of fixing the positions of the spare disk units, the data of the spare disk unit 30-05 on the alternative destination side is again transferred to the recovered disk unit 30-02 and the disk unit 30-05 is again used as a spare. According to the method of dynamically changing the positions of the spare disk units, the spare disk unit 30-05 after the data was reconstructed is set into a component element in the parity group. When the failure disk unit 30-02 is repaired and exchanged and the data is recovered, the spare disk unit 30-05 becomes a spare disk unit and there is no need to again transfer the data. On the other and, in the case where the spare disk unit 30-05 selected in step S2 also caused a failure and cannot be used, the operating mode is shifted to the degenerating mode in step S5. The processing routine is finished as an error.

A flowchart of FIG. 3 shows an error recovery process in the case where a spare disk unit is commonly used by a plurality of ranks, namely, the case where a plurality of spare disk units are grouped and are commonly used. In this case, for instance, now assuming that a failure occurs in the disk unit 30-02 in FIG. 1, the spare disk unit 30-05 allocated to the rank R0 of the failure disk unit 30-02 is first selected in step S1. However, in the case where the spare disk unit 30-05 has failed or has already been used as an alternative destination of the other disk unit, it is judged in step S2 that the spare disk unit cannot be used. In step S5, a check is made to see if there is any other remaining spare disk unit in the other ranks or not. If YES, the spare disk unit 30-15 of the next rank R1 is selected in step S6. As mentioned above, the proper spare disk unit can be selected without being restricted by the rank until the spare disk unit which can be used is obtained. A possibility such that the spare disk unit cannot be selected and the operating mode is shifted to the degenerating mode and the processing routine is finished as an error is reduced and the reliability can be improved. When the positions of the spare disk units are fixed, it is necessary to transfer the data after completion of the recovery of the failure disk unit. In case of dynamically changing the position of the spare disk unit, there is no need to transfer the data after the failure disk unit was recovered.

When comparing such alternating methods of the spare disk unit, according to the method of fixing the spare disk units every rank in FIG. 2, although the control is simple, when there are two failure disk units of the same rank, the alternating process cannot be performed and a possibility such that the spare disk unit cannot be used is high. On the other hand, according to the method whereby the positions of the spare disks are not fixed but are grouped and are commonly used in FIG. 3, although the control is complicated, the alternating process can be executed so long as a spare disk unit exists, and a possibility such that the spare disk unit cannot be used is low. Further, according to the method of fixing the positions of the spare disk units, since it is necessary to transfer the data after the recovery of the failure, it is desirable to select the method whereby the positions of the spare disk units are not fixed and there is no need to transfer the data. Thus, the method whereby the spare disk units are commonly used by a plurality of ranks and the positions of the spare disk units are not fixed is considered to be the most desirable alternating processing method.

However, according to the method whereby the spare disk units are commonly used by a plurality of ranks and the positions of the spare disk units are not fixed, when the spare disk unit is selected at random as an alternative destination of the failed disk unit, there is a case where the spare disk unit of the same port as the port allocated to the same parity group is selected. In this case, two disk units which belong to the same parity group are allocated to one port. For example, logic block data transferred from the upper unit which is known as RAID3 is striped on a unit basis of a predetermined number of bytes and parity data is calculated every parity group and is distributed and stored in parallel into a plurality of disk units. Therefore, when two disk units which belong to the same parity group exist in the same port in the RAID3 due to the failure alternating process, since only one disk unit can be accessed in the same port, it is necessary to successively access to the different disk unit every two times in response to an access request. There is consequently a problem such that an overhead increases and a processing performance is remarkably deteriorated. With respect to such a point, a similar problem also occurs in a method whereby the block data transferred from the upper unit which is known as RAID5 is striped on a sector unit basis (generally, 512-byte unit) of the disk unit and the parity position is changed every access and the data is stored.

There is, further, a problem such that a plurality of disk units which belong to the same parity group are allocated to the same port by the alternating process of the spare disk units and, even when a processing performance has already been deteriorated, such a state cannot be recognized by the operator or maintenance person.

According to the present invention, there are provided method and apparatus for taking a countermeasure for a failure of a disk array, in which the selection of an alternative destination by a spare disk unit at the time of occurrence of a failure is optimized and a deterioration of performance after data was reconstructed can be prevented.

First, a disk array of the invention has a plurality of disk units which are respectively multistage connected to a plurality of ports which are arranged in parallel and construct a plurality of ranks R0 to R3.

Those disk units are classified into: a data disk unit to store data; a plurality of data disk units to store the data on a unit basis of a predetermined redundancy group; a plurality of redundancy disk units to store redundancy data every redundancy group which is constructed by a plurality of data disk units for storing data; and a standby spare disk unit as a spare.

With respect to such a disk array, according to the invention, when the data disk unit or redundancy disk unit fails, the spare disk unit connected to the port other than the redundancy group to which the failure disk unit belongs is selected as an alternative destination by a spare disk selecting section. For example, one parity group is formed by five disk units provided for the ports P0 to P4. When a failure occurs in the disk unit in the port P2 among those ports, the spare disk unit connected to the port P5 other than the ports P0 to P4 which belong to the parity group of the failure disk unit is selected as an alternative destination. Further, the spare disk unit selected by the spare disk selecting section has a data reconstructing section to reconstruct the data of the failure disk unit.

In the case where the spare disk unit connected to the ports other than the redundancy group to which the failure disk unit belongs doesn't exist, the spare disk selecting section selects the spare disk unit, as an alternative destination, connected to the port included in the redundancy group to which the failure disk unit belongs. In this case, when a plurality of spare disk units connected to the port included in the redundancy group to which the failure disk unit belongs exist, the spare disk unit of the port in which the number of accessing times obtained with reference to statistical information is smallest is selected as an alternative destination. When selecting the spare disk, the spare disk unit of the alternative destination is selected with reference to a device management table in which an identifier indicating whether the disk unit is a spare unit or not by using the device number as an index, port numbers, and rank numbers have been stored. There is further provided an output display section for outputting and displaying a performance deterioration to the outside in the case where the spare disk unit connected to the ports other than the redundancy group to which the failure disk unit belongs could not be selected as an alternative destination by the spare disk selecting section.

By selecting most preferentially the spare disk unit existing in the ports other than the parity group to which the failure disk unit belongs as an alternative destination and by executing the data reconstructing process, it is possible to certainly prevent that two or more disk units included in the same parity group are allocated to the same port after the data was reconstructed. The performance deterioration due to the failure alternation can be certainly prevented. In the case where the spare disk unit existing in the port other than the parity group to which the failure disk unit belongs could not be selected as an alternative destination, the spare disk unit connected to the port in the parity group to which the failure disk unit belongs is selected. In this case, when a plurality of spare disk units can be selected, the spare disk unit on the port in which the number of accessing times is small on the basis of the statistical information is selected. Therefore, even in a state in which two disk units of the same parity group are allocated to the same port, since the number of accessing times of such a port is small, a degree in which they are obstructed by the access of the other parity groups is small and the performance deterioration can be suppressed to the minimum necessary limit. Further, information indicating that a plurality of disk units belonging to the same parity group were allocated to the same port is generated and displayed, so that the operator or maintenance person can soon recognize the deterioration of the performance of the system and can execute a necessary maintenance repair. A prompt recovery of the performance of the system can be expected.

According to another aspect of the invention, at the time of initialization, the disk units at the different port positions are allocated every rank as spare disk units of the highest priority by a spare disk allocating section. Further, the spare disk units allocated to the other ranks are allocated to lower orders. When the data disk unit or redundancy disk unit fails, a spare disk selecting section selects the spare disk unit as an alternative destination on the basis of the allocating order of the spare disk allocating section. When the spare disk unit is selected by a spare disk selecting section, a data reconstructing section reconstructs the data of the failure disk unit or the redundancy disk information. Further, when a spare disk selecting section selects the spare disk unit having a lower priority on the basis of the allocating order of the spare disk allocating section, the spare disk selecting section refers to the statistical values of fault occurrence information such as number of data checks, number of seek error times, and the like of all of the disk units belonging to the same rank as that of the selected spare disk unit. In the case where the statistics value exceeds a predetermined threshold value, the spare disk unit which is allocated at a lower priority is further selected.

In the above another aspect, the spare disk unit is allocated to the different port position every rank at the time of initialization and the spare disk unit belonging to the same rank as that of the failure disk unit is most preferentially allocated as an alternative destination. Due to this, it is possible to certainly prevent that a plurality of disk units belonging to the same parity group are allocated to the disk unit of the same port. The deterioration of the performance by the failure alternating process can be certainly prevented. On the other hand, even in case of selecting the spare disk unit of the other rank in accordance with a predetermined lower priority, fault states of the disk units belonging to the rank to which the selected spare disk unit belongs are checked from the statistics information. When it is judged that the possibility of the occurrence of a failure is high, the spare disk unit of this rank is not selected as an alternative destination but another spare disk unit is selected from the rank of the next order. In case of selecting the spare disk unit of such another rank, by considering the fault occurrence state, a situation such that the spare disk unit of the own rank having the highest priority at the time of occurrence of a failure cannot be used due to the failure alternating process of the other rank is suppressed. The optimum fault alternating process which is not so influenced by the states of the other ranks can be executed.

The above and other objects, features, and advantages of the present invention will become more apparent from the following detailed description with reference to the drawings.

BRIEF DESCRIPTION OF THE DRAWINGS

FIG. 7 is an explanatory diagram showing a format construction of management information of a device management table;

FIG. 8 is an explanatory diagram of a device management table in FIG. 5;

FIG. 12 is an explanatory diagram of a device management table corresponding to FIG. 11;

FIG. 14 is an explanatory diagram of a spare disk allocation table in which allocating priorities are determined and which is used in FIG. 13.

DETAILED DESCRIPTION OF THE PREFERRED EMBODIMENT

[Hardware construction of system]

Figure 1:
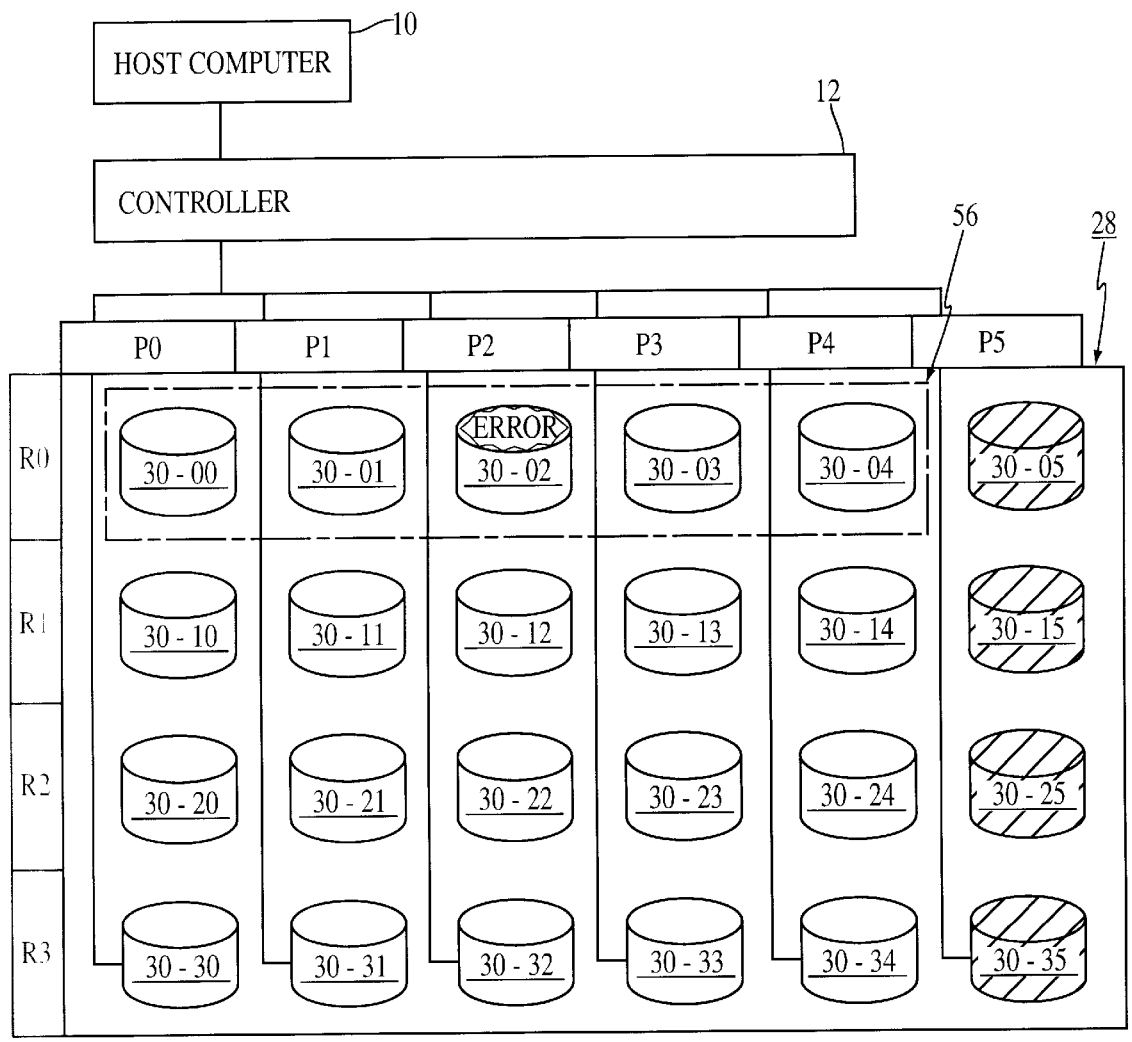
FIG. 1 is an explanatory diagram showing a schematic construction of a conventional apparatus.
Figure 2:
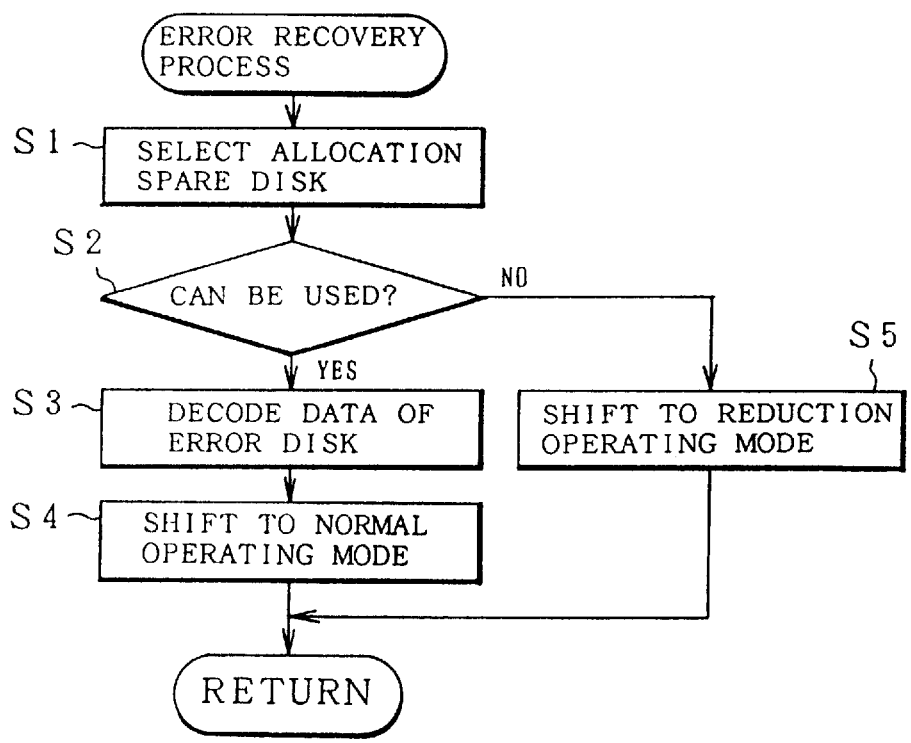
FIG. 2 is a flowchart of an error recovery method whereby spare disks are fixed to a rank.
Figure 3:
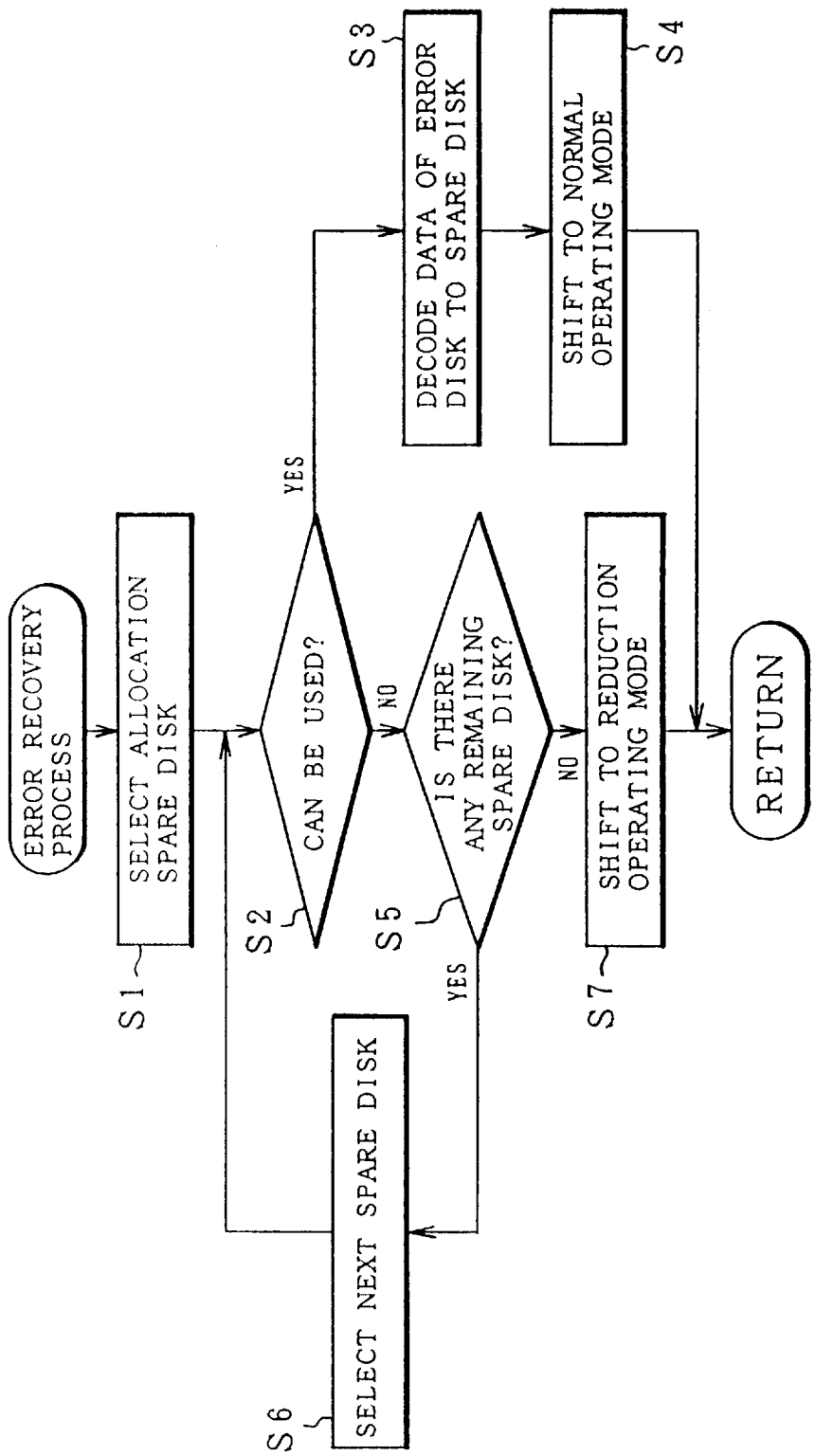
FIG. 3 is a flowchart of an error recovery method whereby spare disks are commonly used by a plurality of ranks.
Figure 4:
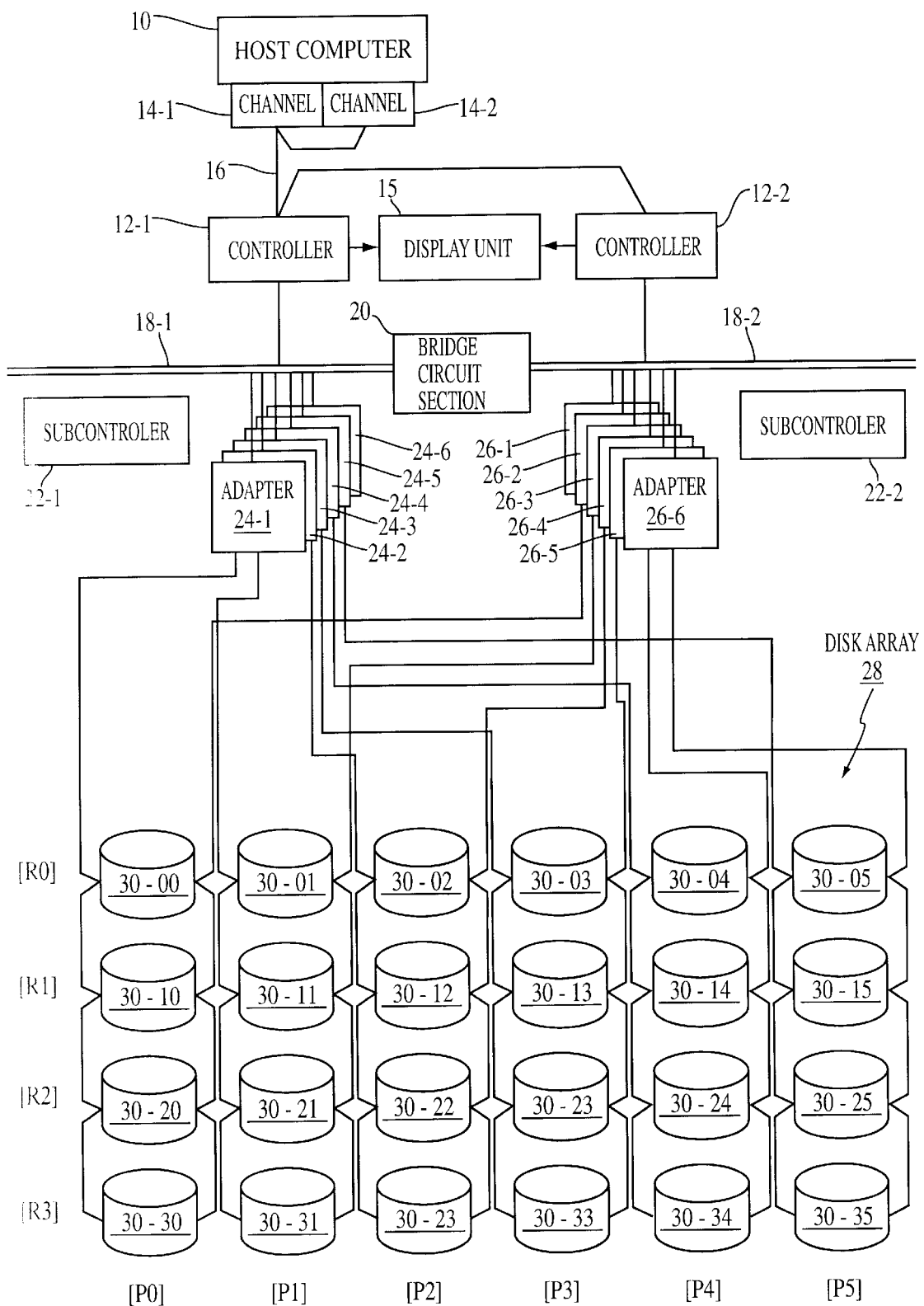
FIG. 4 is a block diagram showing a hardware construction of a disk array to which the invention is applied.

FIG. 4 shows a hardware construction of input/output subsystems using a disk array to which a failure countermeasure method of the present invention is applied. At least two channel units 14-1 and 14-2 are provided for the host computer 10. Two controllers 12-1 and 12-2 are connected to those channel units through a channel interface 16. An SCSI is used as a channel interface 16. An MBC interface (block multiplexer channel interface) can be also used. The controllers 12-1 and 12-2 have a function as input/output control means and can mutually transmit and receive information and data by connecting common buses 18-1 and 18-2 on the device side by a bridge circuit section 20. Subcontrollers 22-1 and 22-2 are provided for the common buses 18-1 and 18-2, respectively, thereby distributing the processing functions of the controllers 12-1 and 12-2 and reducing a load. Twenty-four disk units 30-00 to 30-35 provided in the disk array 28 are connected to the common buses 18-1 and 18-2 through adapters 24-1 to 24-6 and 26-1 to 26-6, respectively.

The disk array 28 constructs a parallel disk group by six ports P0 to P5 which are accessed in parallel by the controllers 12-1 and 12-2. Four such parallel disk groups are provided for four ranks R0 to R3. Specifically speaking, the rank R0 is constructed by six disk units 30-00 to 30-05 corresponding to the ports P0 to P5. The rank R1 is constructed by the disk units 30-10 to 30-15 corresponding to the ports P0 to P5. The rank R2 is constructed by the disk units 30-20 to 30-25 corresponding to the ports P0 to P5. Further, the rank R3 is constructed by the disk units 30-30 to 30-35 corresponding to the ports P0 to P5. The positions of the disk units constructing such a disk array 28 are defined by addresses (R, P) which are determined by the numbers of the ranks R and ports P. For example, the magnetic disk unit 30-00 can be expressed by the address (R0, P0).

Figure 5:
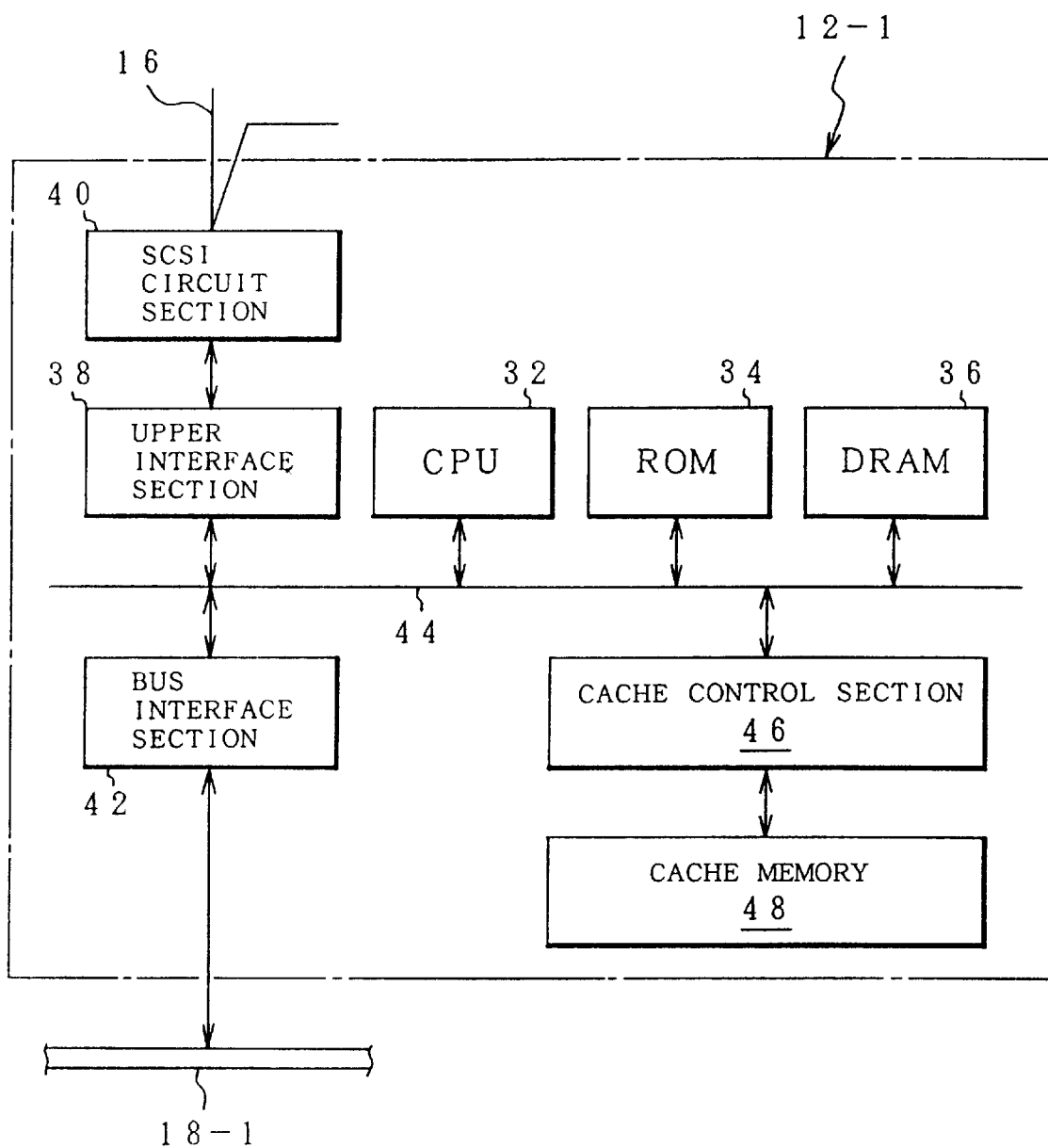
FIG. 5 is a block diagram showing a hardware construction of a controller in FIG. 4.

FIG. 5 shows a hardare construction on the controller 12-1 side in FIG. 4. A CPU 32 is provided in the controller 12-1. An upper interface section 38 to communicate with a ROM 34, a DRAM 36, and an SCSI circuit section 40 and a bus interface section 42 for communicating with the common bus 18-1 side are connected to an internal bus 44 in the CPU 32. Further, a cache control section 46 and a cache memory 48 are provided, thereby realizing a disk cache mechanism. The control to the disk array 28 which is executed by the CPU 32 provided for the controller 12-1 when the CPU 32 receives the access request from the host computer 10 is performed in either one of the operating modes which are known as RAID0, RAID1, RAID3, and RAID5 by an instruction from the host computer.

The RAID mode will now be briefly explained as follows. David A. Patterson et al., of University of California at Berkeley have conventionally proposed RAID1 to RAID5 as levels to classify the disk array (refer to ACM SIGMOD Conference, Chicago, Ill., Jun. 1 to 3, 1988). The RAID0 relates to a disk array having no redundancy of data. Although such a disk array is not included in the classification of David A. Patterson, et al., it is ordinarily called RAID0. RAID1 relates to a mirror disk unit in which two disk units are set to one set and the same data is written. Although the use efficiency of the disk unit is low, RAID1 has a redundancy and can be realized by a simple control. Therefore, RAID1 is widely spread. In RAID2, the data is striped on a bit or byte unit basis and is written in parallel into the disk units. The striped data is physically recorded to the same sector by all of the disk units. In addition to the data disk units, the disk array has a disk unit to record a Hamming code, the failure disk unit is specified from the Hamming code, and the data is reconstructed. However, RAID2 is not yet put into practical use at present.

In RAID3, the data is striped on a bit or byte unit basis, parities are calculated, and the data and parities are written in parallel into the disk unit. Although RAID3 is effective in case of continuous handling a large amount of data, in case of a transaction process such that a small amount of data is accessed at random, a high speed of the data transfer is not effectively used and the efficiency is deteriorated.

In RAID4, one data is striped on a sector unit basis and is written into the same disk unit. The parity data is stored into a fixedly determined disk unit. When data is written, the old data and old parity before writing are read out and a new parity is calculated and written. Therefore, total four disc accesses are needed with respect to one writing operation. Since the access to the disk unit for parity certainly occurs when writing, the writing operations of a plurality of disk units cannot be simultaneously executed. Although RAID4 has been defined, since a merit is small, it is not yet put into practical use at present.

In RAID5, since the disk unit for parity is not fixed, the reading and writing operations can be executed in parallel. That is, the disk unit in which the parity data is put differs every sector. When the disk units to which the parity data are put are not overlapped, the sector data can be written in parallel to different disk units. In RAID5, a plurality of disk units can be asynchronously accessed and the reading or writing operation can be executed as mentioned above, so that RAID5 is suitable for the transaction process in which a small amount of data is accessed at random.

[Failure alternating process]

Figure 6:
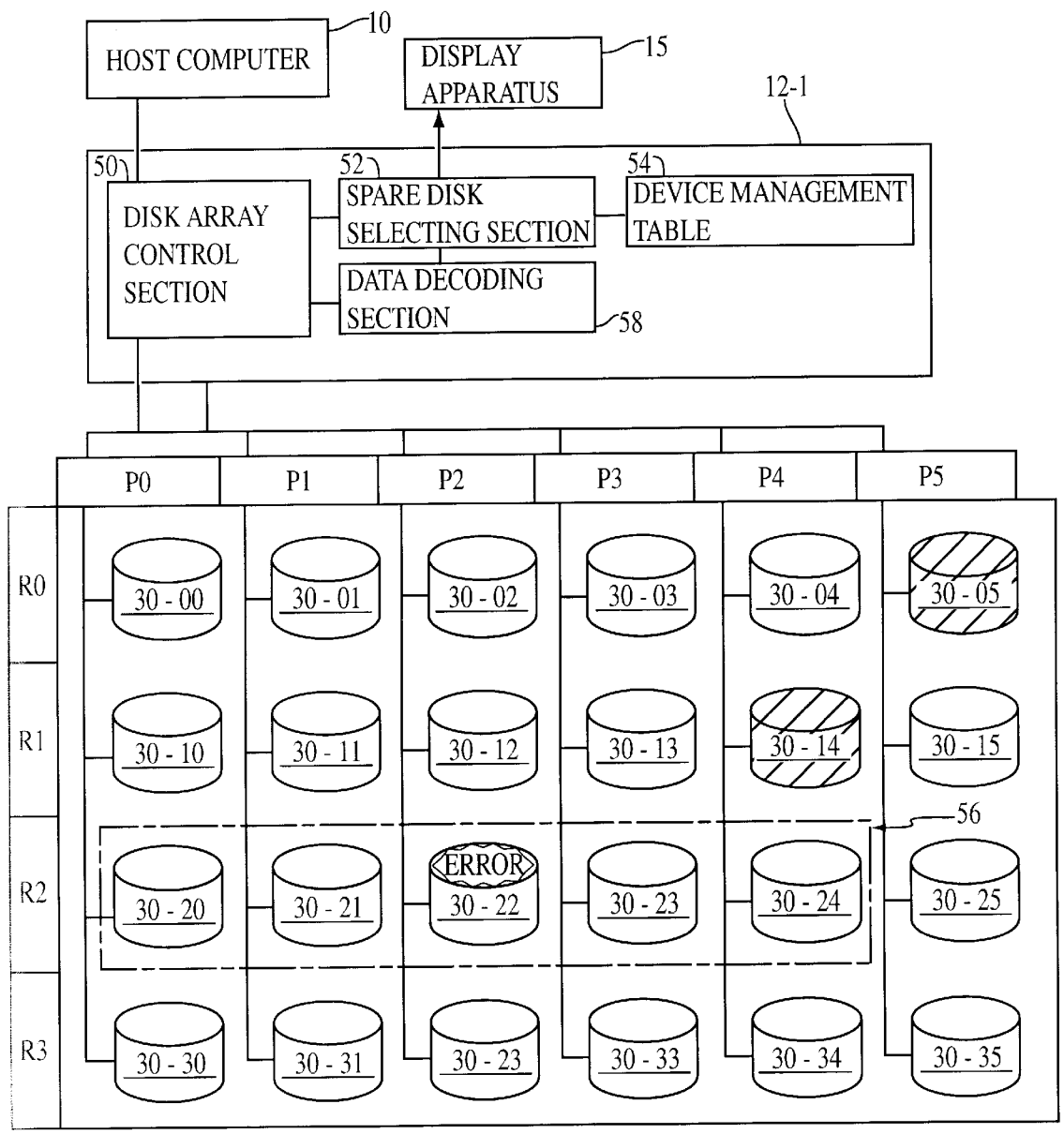
FIG. 6 is a block diagram showing the functions of the invention.

FIG. 6 shows processing functions of the failure alternating process according to the invention. For simplicity of explanation, the controller 12-1 side in the hardware construction of FIG. 4 is shown as a representative. The controller 12-1 has a disk array control section 50, a spare disk selecting section 52, a device management table 54, and a data reconstructing section 56. Further, a display apparatus 15 to output and display for the operator and a maintenance person is provided in the outside of the controller 12-1. The disk array 28 is shown as an example of a disk array which is constructed by 24 disk units 30-00 to 30-35 having six ports P0 to P5 and four ranks R0 to R3. Among them, two disk units 30-05 and 30-14 shown by hatched portions are allocated as spare disk units. Further, as an example, there is shown a case where a parity group of RAID3 or RAID5 is constructed by five disk units 30-20 to 30-24 which belong to the rank R2. Management information shown in FIG. 7 has been stored for every disk unit of the disk array 28 in the device management table 54 provided for the controller 12-1. The device management information is constructed by: a device controller ID 70 indicative of the correspondence relations with the adapters 24-1 to 24-6 shown in FIG. 4; an identifier 72 indicating whether the disk unit is a spare disk or not; a rank number 74 of the rank to which the self disk belongs; and a port number 76 at which the disk is located. In the device controller ID 70, 00 to 05 are used in correspondence to the adapters 24-1 to 24-6. The spare identifier 72 is set to "1" in case of the spare disk unit and is set to "0" when the disk unit is not a spare disk unit. Further, 0 to 4 indicative of the ranks R0 to R4 are used for the rank number 74. 0 to 5 indicative of the ports P0 to P5 are used for the port number 76.

FIG. 8 shows an example of the device management table 54 indicative of the states of the disk units in the disk array 28 shown in FIG. 5. The states until the rank R2 are shown. For example, when seeing the head disk unit 30-00 belonging to the rank R0 of the device number 00, the device management information is equal to "0000". "0" in the head position denotes the device controller ID 70 and since the number is equal to "0", it indicates the adapter 24-1 in FIG. 4. The second number "0" denotes the spare identifier 72 and since it is equal to "0", the identifier is not allocated for spare and it indicates that the disk unit is the ordinary disk unit for data or parity. The third number "0" indicates the rank No. 74 and indicates the rank R0. The fourth number "0" indicates the port number 76 and indicates the port P0. Since there are two disk units 30-05 and 30-14 as spare disk units in the disk array 28 in FIG. 5, the device management information in the device number "05" in FIG. 8 is set to "5105". Since the second number is equal to "1", it indicates that the disk unit is a spare disk unit. Similarly, with respect to the disk unit 30-14 of the device No. 22 as well, the device management information by the device No. 14 is set to "4114". Since the second number is equal to "1", it indicates that the disk unit is a spare disk unit.

Referring again to FIG. 6, when the spare disk selecting section 52 provided in the controller 12-1 executes a set-up process for an arbitrary disk unit in the disk array 28 as a target to be accessed on the basis of an access request from the host computer 10, if a notification of a device error such as a hard error or the like which cannot be recovered is received from the disk unit, the spare disk selecting section 52 selects the spare disk unit serving as an alternative destination of the failure disk unit and allows the data reconstructing section 58 to execute a process to reconstruct the data of the failure disk unit into the selected spare disk unit. A selection rule of the spare disk by the spare disk selecting section 52 is such that a spare disk existing in the port other than the parity group to which the failure disk belongs is selected.

For instance, it is now assumed that the disk unit 30-22 in a parity group 56 locating at the rank R2 of the disk array 28 failed. In this case, the spare disk selecting section 52 selects the port other than the ports P0 to P4 of the parity group 56 to which the failure disk unit 30-22 belongs, namely, the port P5 is selected. The spare disk unit 30-05 connected to the port P5 other than the parity group is selected as an alternative destination. If the spare disk unit which can be used doesn't exist in the port other than the parity group, the spare disk selecting section 52 subsequently selects the spare disk unit existing on the port in the parity group of the failure disk unit. In case of selecting the spare disk unit from the port in the parity group, so long as a plurality of spare disk units can be selected, the spare disk unit of the port in which the number of accessing times is smallest is selected as an alternative destination with reference to the number of accessing times per port which has been logged as statistical information in the disk array control section 50.

Figure 9:
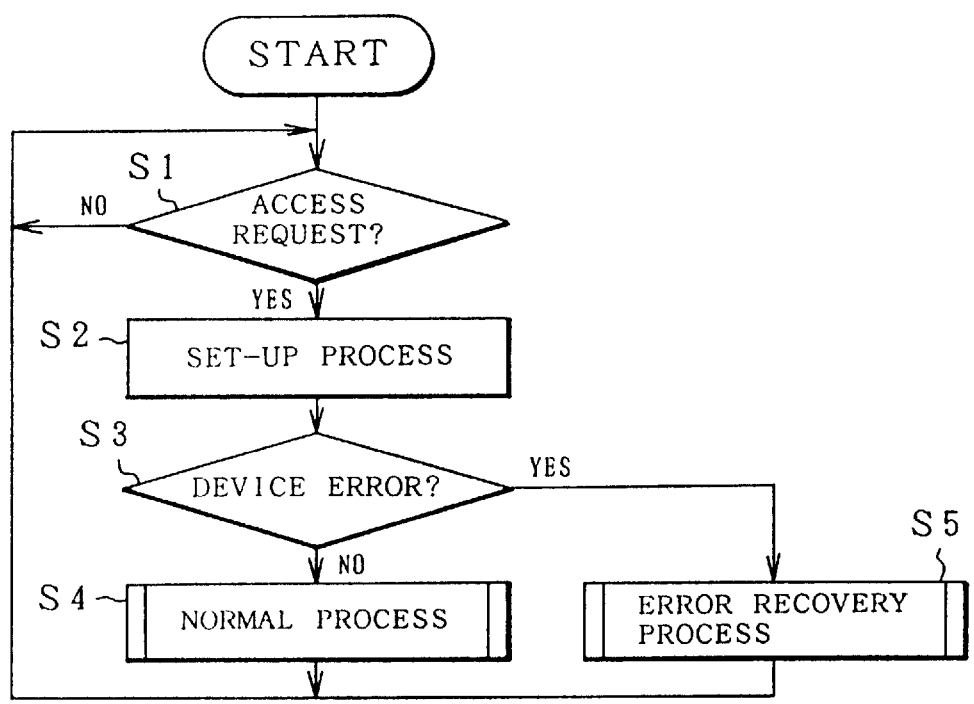
FIG. 9 is a flowchart showing a whole process of the invention.

A flowchart of FIG. 9 shows the whole processing operation of the controller 12-1 shown in FIG. 5. First, in step S1, the access requirement from the host computer 10 is judged. When there is an access request, step S2 follows and a set-up process is executed to the disk unit as an access target in the disk array 28 which was analyzed from the access information. For the set-up process, when the disk unit side has a failure such as a hardware error or the like which cannot be recovered, an error is notified to the controller 12-1. A device error is judged in step S3 and an error recovery process shown in step S5 is executed. If there is no device error, the processing routine advances to the ordinary process in step S4 and a reading or writing process based on the access request from the host computer 10 is executed.

Figure 10:
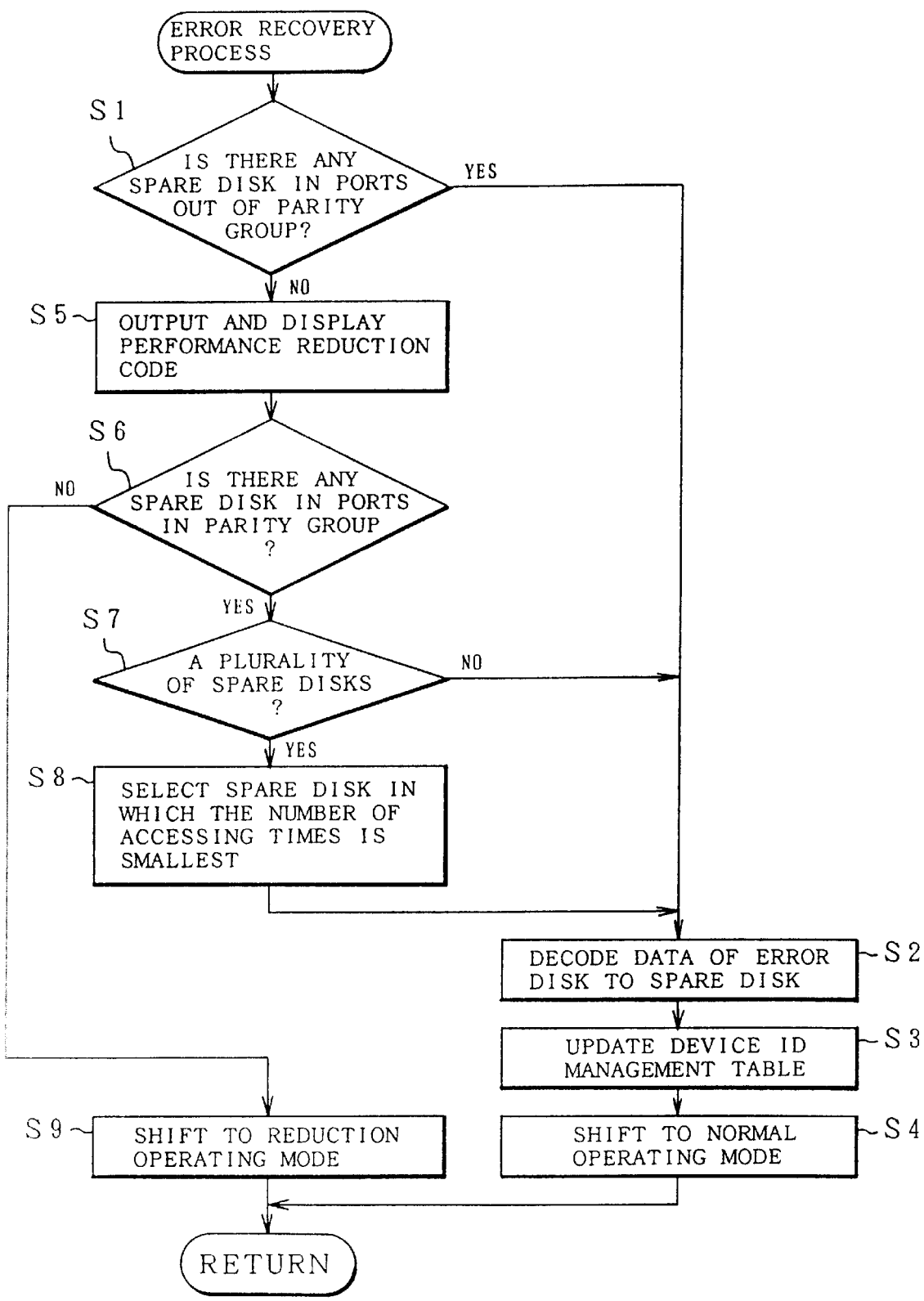
FIG. 10 is a flowchart showing an error recovery process in FIG. 4.

A flowchart of FIG. 10 shows the details of the error recovery process in FIG. 9. In the error recovery process, first in step S1, by referring to the device management table 54, a check is made to see if a spare disk unit exists in the port other than the parity group to which the failure disk unit belongs or not. For example, in the case where the presence of the device error is judged by the set-up process to be the disk unit 30-22 of the parity group 56 of the disk array 28, with reference to the device management table 54 in FIG. 8, the device No. 22 indicates the failure disk unit and the disk units 30-20 to 30-24 of the device Nos. 20 to 24 are included in the parity group 56 including the failure disk unit. From the device management information, it will be understood that the ports P0 to P4 are the ports of the parity group. Therefore, the port out of the parity group is the remaining port P5. It will be understood that the disk unit 30-05 of the device No. 05 exists as a spare disk unit connected to the port P5. As mentioned above, when there is the spare disk existing in the port other than the parity group, it is selected as an alternative destination of the failure disk unit and the processing routine advances to step S2. A process to reconstruct the data of the failure disk unit into the selected spare disk unit is executed. According to the data reconstructing process, the data is read out in parallel from the other normal disk units existing in the parity group excluding the failure disk and the data of the failure disk unit is reconstructed and written into the selected spare disk unit. When the data reconstructing process for the spare disk unit is finished in step S2, the device management table 54 is updated in step S3. For example, in the case where the device No. 05 in FIG. 8 is selected as a spare disk unit on the alternative destination side and the data is reconstructed, the device management information "5105" is changed to "5005". Subsequently, in step S4, the operating mode is shifted to the ordinary mode. When shifting to the ordinary mode, the device No. of the spare disk unit included in the parity group as an alternative destination is replaced to the device No. of the failure disk unit constructing the parity group and is set into the disk unit constructing the parity group after completion of the data reconstruction.

On the other hand, in step S1, when no spare disk unit exists in the port other than the parity group, a performance deterioration code is generated and displayed on the display apparatus 15 in step S5, thereby enabling the operator or maintenance person to recognize that the apparatus is in an operating state in which the processing performance deteriorated. In step S6, with reference to the device management table 54, a check is made to see if there is a spare disk unit in the port in the parity group or not. If YES, step S7 follows and a check is made to see if a plurality of spare disk units exist in the port in the parity group or not. If only one spare disk unit exists, it is selected as an alternative destination and the data reconstructing process in step S2 follows. When a plurality of spare disk units exist, step S8 follows. The spare disk unit of the port in which the number of accessing times is smallest is selected with reference to the numbers of accessing times recorded as statistical information on the disk array control section 50 side with respect to the port at which each spare disk unit is located. The data reconstructing process in step S2 is executed.

Further, in step S6, no spare disk unit exists also in the port in the parity group, the alternating process of the failure disk unit cannot be executed, so that the operating mode is shifted to the degenerating mode in step S9. In the degenerating mode, since the accessing process as a parity group is substantially impossible, the operating mode is set to an operating mode of the reduced function such that the access to the parity group including the failure disk unit is inhibited and the access to only the other effective parity group is permitted. When the function of the parity group including the failure disk unit is stopped, such a state is output and displayed onto the display apparatus 15, thereby promoting the operator or maintenance person to execute the corresponding process.

Figure 11:
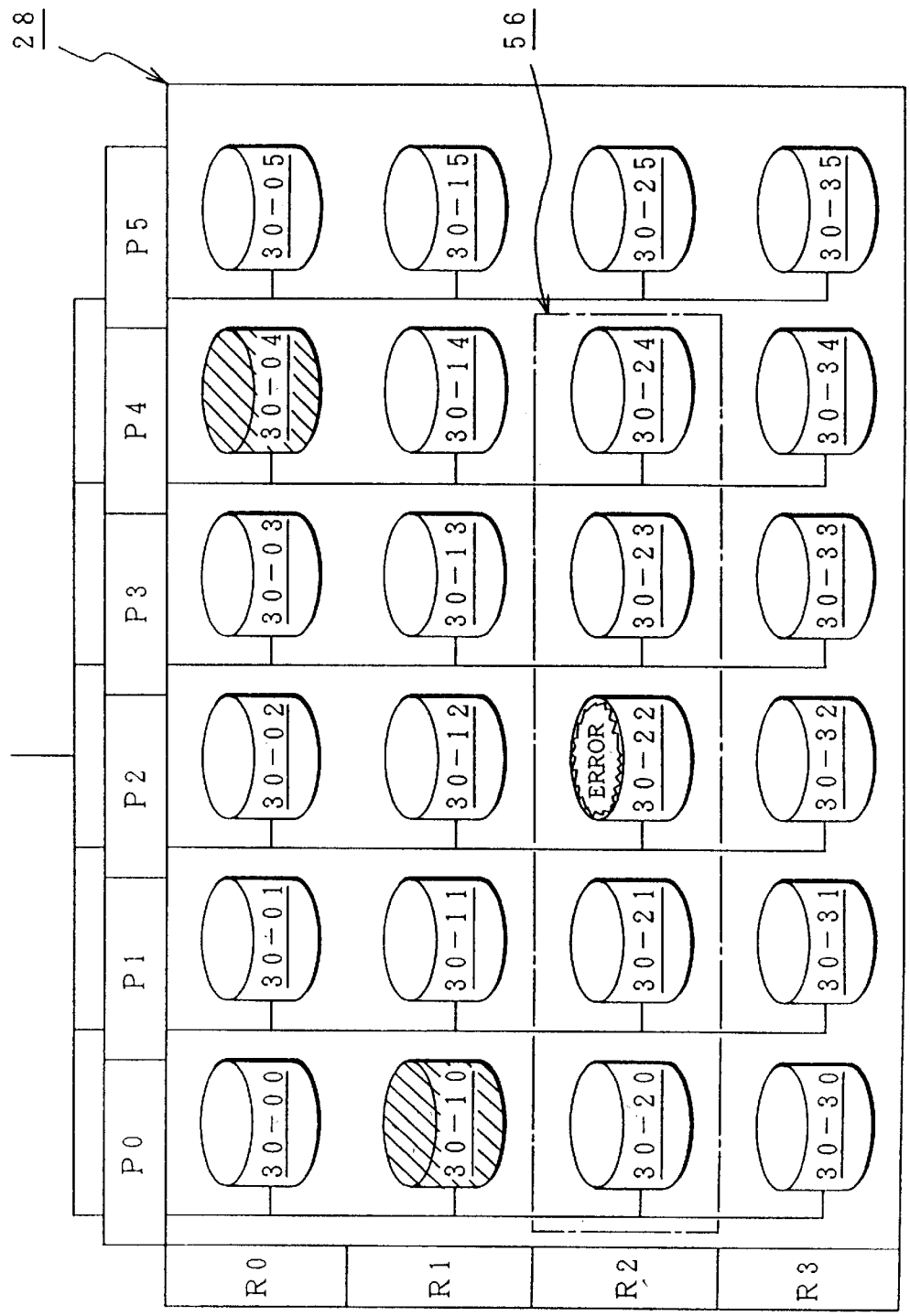
FIG. 11 is an explanatory diagram showing an arrangement state of other spare disk units of a disk array in FIG. 5.

FIG. 11 shows a state of the disk array 28 in the case where no spare disk unit exists in the port other than the parity group in step S1 in FIG. 10. Such a state occurs in the case where, when the disk unit 30-22 in the parity group 56 constructed by the disk units 30-20 to 30-24 which belong to the rank R2 fails, the spare disk units 30-04 and 30-10 shown by hatched regions have been located in the ports P1 and P4 of another parity group.

FIG. 12 shows the device management table in the state of FIG. 11. That is, the device management information of the spare disk unit 30-4 of the device No. 04 is set to "4104" and the second number is equal to "1", so that it indicates the allocation for spare. Likewise, the device management information of the disk unit 30-10 of the device No. 10 is also set to "0110" and the second number is equal to "1", so that it indicates the allocation for spare.

In the state as shown in FIG. 11, since no spare disk unit exists in the port P5 other than the parity group 56 to which the failure disk unit 30-22 belongs, the spare disk unit existing in the ports P0 to P4 in the parity group 56 is selected as an alternative destination. In this case, one spare disk unit exists in each of the ports P0 and P4. Namely, total two spare disk units 30-04 and 30-10 exist. Therefore, the total value of the numbers of accessing times recorded on the controller side as statistics information with respect to the disk units 30-00, 30-10, 30-20, and 30-30 connected to the port P0 is obtained. Similarly, the total value of the numbers of accessing times with regard to the disk units 30-04, 30-14, 30-24, and 30-34 connected to the port P4 is obtained. If the spare disk unit 30-10 is the port in which the total value of the accessing times is small, for instance, then port P0 is selected as an alternative destination and the data of the failure disk unit 30-22 is reconstructed. By the data reconstruction by the selection of the spare disk unit 30-10 as mentioned above, the parity group after completion of the data reconstruction is constructed by five disk units 30-10, 30-20, 30-21, 30-23, and 30-24. Therefore, two disk units 30-10 and 30-20 belonging to the same parity group exist in the port P0. In case of accessing by RAID3 in such a state, or in case of simultaneously accessing the disk units 30-10 and 30-20 by RAID5, it is necessary to access the disk units 30-10 and 30-20 two times divisionally from the port P0. The processing performance deteriorates by only the amount of such divisional processes. However, since the port P0 side in which the number accessing times is smallest is selected as for the spare disk unit 30-10 which was selected as an alternative destination, the number of accessing times by the other parity groups, that is, the number of accessing times by the disk units 30-00 and 30-30 is inherently small, the deterioration of the processing performance can be suppressed to the necessary minimum limit without being obstructed by such accessing processes.

In case of selecting the spare disk unit from the port in the parity group, if the spare disk unit existing in the same port P2 as that of the error disk unit 30-22 could be selected, the parity group is merely constructed over the different ranks after completion of the data reconstruction and the deterioration of the processing performance doesn't occur fundamentally. Since the parity group is formed over the different ranks, for the designation of the parity group due to the logic device number from the host computer, the conversion into the physical device is slightly complicated.

[Modification of failure alternating process]

Figure 13:
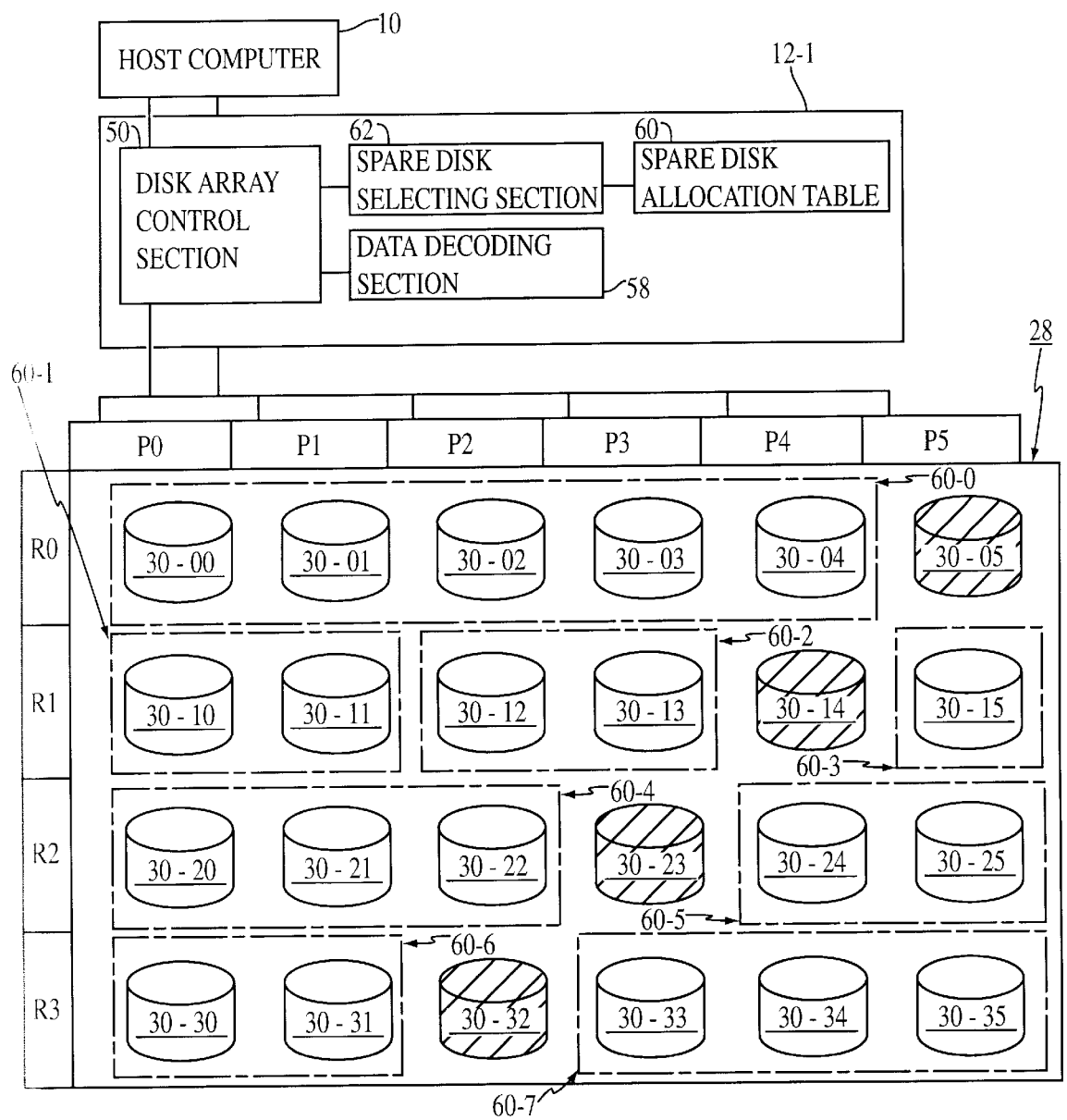
FIG. 13 is an explanatory diagram showing the functions in another aspect of the invention.

FIG. 13 shows processing functions according to another format of the invention and shows the controller 12-1 side in the hardware construction in FIG. 4. The controller 12-1 is provided with the disk array control section 50, a spare disk allocation table 60, a spare disk selecting section 62, and the data reconstructing section 58. In a manner similar to FIG. 5, the disk array 28 is constructed by 24 disk units 30-00 to 30-35 comprising six ports P0 to P5 and four ranks R0 to R3. In the spare disk allocation table 60, one spare disk unit is allocated to each of the ranks R0 to R3 of the disk array 28 at the initialization stage and the spare disk units are allocated so that their positions are different every rank. For instance, at the rank R0, the spare disk unit 30-05 is allocated to the port P5. At the rank R1, the spare disk unit 30-14 is allocated to the port P4. At the rank R2, the spare disk unit 30-23 is allocated to the port P3. Further, at the rank R3, the spare disk unit 30-32 is allocated to the port P2. For such an allocation of the spare disk units whose positions differ every rank, the disk array control section 50 sets logic device groups 60-0 to 60-7 with respect to the remaining disk units. For example, the logic device group 60-0 formed by five disk units 30-00 to 30-04 of the ports P0 to P4 of the rank R0 operates at RAID3 or RAID5. The logic device groups 60-1 and 60-2 formed at the rank R1 operate as mirror disks of RAID1 because they have two disk units. Further, three disk units 30-20 to 30-22 of the logic group 60-4 of the rank R2 are used for parallel access in the operating mode of RAID0 having no parity disk. The operating format of a proper RAID can be also set as necessary with respect to the other logic groups 60-5 to 60-7. By combining the logic device groups 60-6 and 60-7 shown at the rank R3, the operation of RAID3 or RAID5 can be also executed.

FIG. 14 shows a specific construction of the spare disk allocation table 60 in FIG. 13. The rank information is stored in the spare disk allocation table 60 by using the logic device Nos. 0 to 7 of the logic device group which were set with respect to the disk array 28 as indices. Subsequent to the rank information, the selection orders as spare disk units are determined as priorities 0, 1, 2, and 3. First, when seeing the logic device No. 0 of the logic device group 60-0 of the rank No. 0 indicative of the rank R0, the device No. 05 of the disk unit 30-05 belonging to the same rank has been stored in the highest priority 0. The above point shall also apply to the other logic devices 1 to 7 and the spare disk unit provided in the self rank is set to the highest priority 0. With respect to the lower priorities 1 to 3, for example, as for the logic device group 60-0 of the rank R0, the device numbers of the spare disk units 30-14, 30-23, and 30-32 of each rank have been registered in accordance with the order of the ranks R1, R2, and R3. When the failure of the disk unit is judged by the set-up process, the spare disk selecting section 62 provided in the controller 12-1 selects the spare disk unit of the priority 0 with reference to the spare disk allocation table 60 by the device ID of the logic device group which the failure disk unit belongs, thereby reconstructing the data from the failure disk unit by the data reconstructing section 58. On the other hand, in the case where the spare disk unit of the highest priority 0 fails or the case where it cannot be used by the selection of the failure alternative destination by another rank, the spare disk unit existing in another rank of the first priority is selected. When selecting the spare disk unit existing in such another rank, the statistics values of the fault information such as number of data checking times, number of reconstructing times, or the like about all of the disk units which belong to the rank are referred. When such a number of times exceeds a predetermined threshold value, this means that such a rank is a rank in which a possibility of the occurrence of a failure is high. Therefore, processes such that the spare disk unit of such a rank is not selected but the spare disk unit of the rank of a lower priority of the next order is selected are executed.

Figure 15:
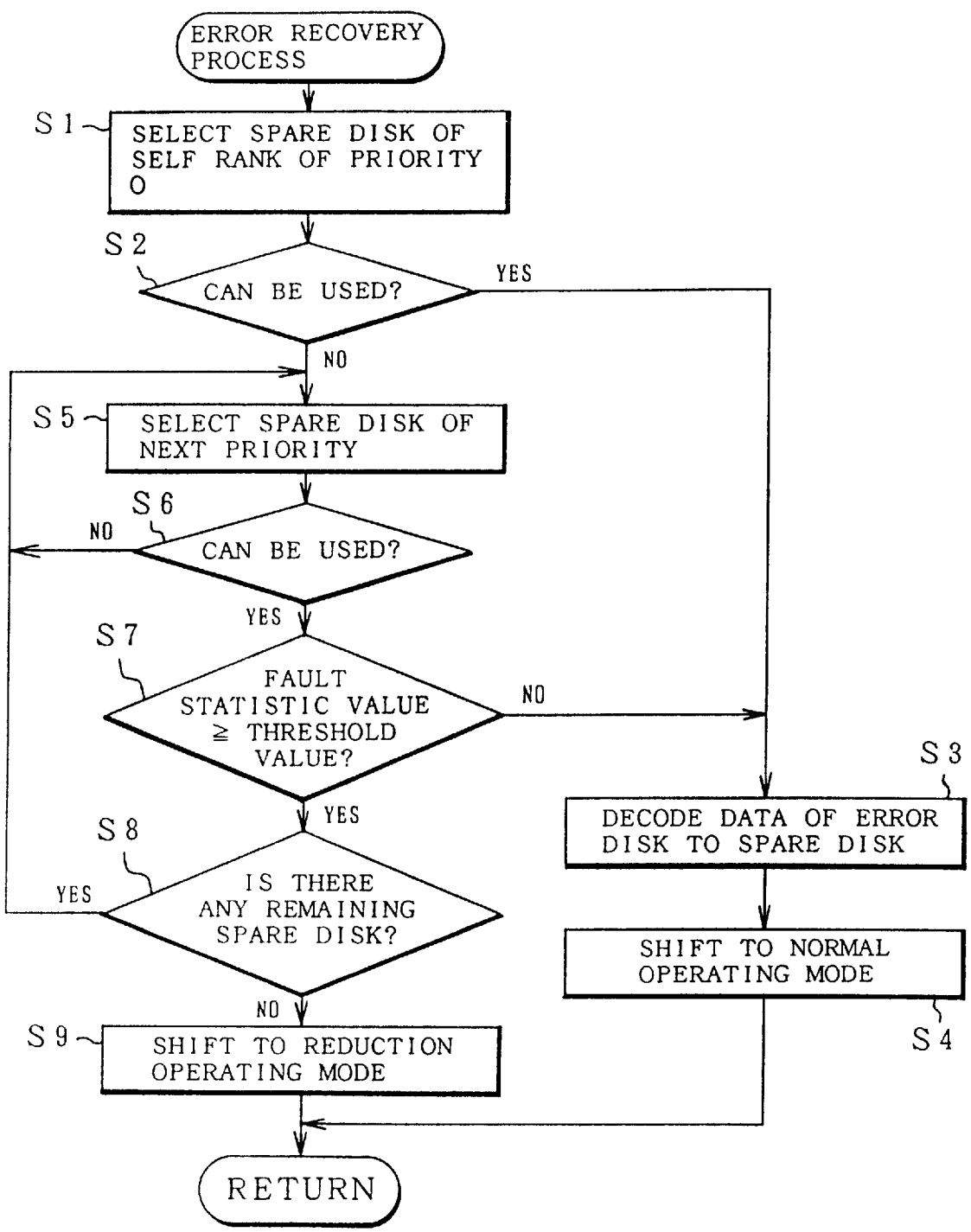
FIG. 15 is a flowchart showing the error recovery process in FIG. 13.

A flowchart of FIG. 15 shows the details of an error recovery process in the modified invention of FIG. 13. When a failure of the disk unit is judged through the set-up process for the access request from the host computer 10 shown in FIG. 9, the error recovery process in FIG. 15 is executed. First, in step S1, the spare disk unit of the highest priority 0 in the rank to which the failure disk belongs is selected with reference to the spare disk allocation table 60. When the selected spare disk unit can be used in step S2, step S3 follows and the data of the failure disk unit is reconstructed into the selected spare disk unit. The operating mode is shifted to the ordinary operating mode in step S4. In the case where the spare disk unit of the highest priority cannot be used in step S2, step S5 follows and the spare disk unit belonging to another rank of the next priority 1 is selected. When the spare disk unit belonging to such another rank of the next priority 1 can be used in step S6, step S7 follows. The total value of the fault statistics values such as number of data checking times, number of seek error times, or the like in all of the disk units of the rank to which the selected spare disk unit belongs is compared with a predetermined threshold value. When the statistics value is smaller than the threshold value, the selected spare disk unit is decided as an alternative destination. Step S3 follows and the data of the failure disk unit is reconstructed. However, when the fault statistics value is equal to or larger than the threshold value, since a degree of occurrence of a future disk failure at that rank is high, the spare disk unit is not selected but step S8 follows. The presence or absence of the unselected spare disk unit is discriminated. When any other unselected spare disk unit exists, the spare disk unit of the next priority 2 is selected in step S5 and the judgment based on the similar fault statistics value is repeated. In the case where the spare disk unit cannot eventually be selected by the repetition of the processes in steps S5 to S8, the processing routine advances to step S9. In this case, since the operation cannot be executed in the RAID mode in the logic group address including the failure disk unit, with respect to RAID0, RAID3, and RAID5, the subsequent operations are inhibited. As for RAID1, the operating mode is shifted to the degenerating mode in which only the operating mode in RAID0 is permitted.

In the modified invention shown in FIG. 13, in case of setting the operating mode such that the positions of the spare disk units are fixed, it is sufficient that the data of the spare disk unit which becomes an alternative destination after the recovery by the repair or exchange of the failure disk unit is transferred to the recovered disk unit and the disk is again set into a standby state as a spare disk unit. In case of dynamically changing the positions of the spare disks, since the spare disk units are allocated to the different port positions every rank shown in FIG. 13 when the system is made operative, when the operation of the system progresses and the alternating process for the failure disk is repeated, the spare disk units exist at random positions. Therefore, for example, by requesting the initializing process for the allocation of the spare disk units by the operator or maintenance person in a time zone at night or the like during which a processing load is small, the apparatus can be returned to the initial state shown in FIG. 11.

Although the modified invention has been shown and described with respect to the case as an example where the number of spare disk units which are allocated to the disk array is set to two, two or more arbitrary number of spare disk units can be also allocated. Further, although the modified invention has been described with respect to the case as an example in which total four spare disk units are allocated so that one unit is provided every rank, two or more spare disk units can be also provided per rank in the case where it is necessary to further improve the reliability. Since the spare disk unit is used as a standby unit, it is desirable to set the number of spare disk units to the necessary minimum number.

In addition, although the above embodiment has been described with respect to the disk array comprising six ports and four ranks as an example, the number of ports and the number of ranks can be properly decided as necessary. Further, the invention is not limited by the numerical values shown in the above embodiment.

What is claimed is:

1. A fault countermeasure taking method for a disk array having a plurality of disk units each having a read/write port, a controller for controlling the read/write operations of the disk units, and plurality of disk unit interface ports, the read/write ports being connected to the interface ports to form a plurality of ranks, said fault countermeasure taking method comprising:

a redundancy group allocating step of allocating a plurality of the disk units to each of the plurality of ranks for the storage of data, allocating a parity disk unit to the ranks, the data disk units and said parity disk unit forming, in one rank, at least one redundancy group to store a plurality of data and their parities;

a spare disk allocating step of respectively allocating one spare disk unit to at least two ranks among the plurality of ranks;

a failure detecting step of detecting a failure of an arbitrary disk unit, the read/write port of said failed disk unit being connected to a particular interface port;

a spare disk selecting step of selecting one of said spare disk units connected to the disk units of said redundancy group to which said failed disk unit belongs, wherein said spare disk selecting step selects a spare disk unit connected to an interface port outside said redundancy group to which said failed disk unit belongs when available, in the case where said spare disk unit connected to an interface port outside said redundancy group to which said failed disk unit belongs cannot be selected, said spare disk selecting step selects a spare disk unit connected to an interface port included in said redundancy group to which said failed disk unit belongs and further wherein in the case where said spare disk unit connected to an interface port included in said redundancy group to which said failed disk unit belongs also cannot be selected, generating a performance deterioration code;

a data reconstructing step of reconstructing the data of said failed disk unit into said spare disk unit selected in said spare disk selecting step; and a spare disk updating step of allocating a normal disk unit as a new spare disk unit when said failed disk unit is exchanged with the normal disk unit.

2. A method according to claim 1, wherein in said spare disk selecting step, in the case where a plurality of said spare disk units are connected to interface ports included in said redundancy group to which said failed disk belongs, access times of the ports are logged as statistical information and said spare disk connected to an interface port in the redundancy group to which said failed disk belongs having a smallest number of access times is selected by referring to said statistical information.

3. A method according to claim 1, wherein in said spare disk selecting step, said spare disk unit is selected with reference to a device management table in which identifiers indicating whether said disk unit is a spare disk unit or not by using a device number as an index, interface port numbers, and rank numbers have been stored.

4. A method according to claim 1, further having a display step of outputting and displaying a deterioration of performance when said performance deterioration code is generated in said spare disk selecting step.

5. A disk array formed by a plurality of ranks each of which is constructed by connecting a plurality of disk units to each of a plurality of disk unit interface ports, each disk unit having a read/write port connected to a selected interface port comprising;

redundancy group allocating means for allocating a plurality of the disk units to each of the plurality of ranks for the storage of data, allocating a parity disk unit to said ranks, and forming, in one rank, at least one redundancy group to store a plurality of data and their parities;

spare disk allocating means for respectively allocating one spare disk unit to at least two ranks among the plurality of ranks;

failed disk unit detecting means for detecting a failure of an arbitrary disk unit in said array;

spare disk selecting means for selecting a spare disk unit connected to one of said interface ports other than the interface ports to which the disk units of the redundancy group to which said failed disk unit belongs when available, wherein in the case where said spare disk unit connected to an interface port outside said redundancy group to which said failed disk unit belongs cannot be selected, said spare disk selecting means selects a spare disk unit connected to an interface port included in said redundancy group to which said failed disk unit belongs and further wherein in the case where said spare disk unit connected to an interface port included in said redundancy group to which said failed disk unit belongs also cannot be selected, generating a performance deterioration code;

data reconstructing means for reconstructing the data of said failed disk unit into said spare disk unit selected by said spare disk selecting means; and spare disk updating means for allocating a normal disk unit as a new spare disk unit when said failed disk unit is exchanged with said normal disk unit.

6. A disk array according to claim 5, wherein in the case where a plurality of spare disk units are connected to the interface port included in the redundancy group to which said failed disk unit belongs, said spare disk selecting means logs as statistical information a number of access times of the interface ports and selects said spare disk unit connected to an interface port in the redundancy group to which said failed disk unit belongs having a smallest number of access times with reference to said statistical information.

7. A disk array according to claim 5, wherein said spare disk selecting means selects said spare disk unit with reference to a device management table in which identifiers indicating whether the disk unit is a spare disk unit or not by using a device number as an index, interface port numbers, and rank numbers have been stored.

8. A disk array according to claim 5, further having output display means for outputting and displaying a deterioration of performance when said performance deterioration code is generated by said spare disk selecting means.

9. A fault countermeasure taking method for a disk array having a plurality of disk units each having a read/write port, a controller for controlling the read/write operations of the disk units, and a plurality of disk unit interface ports, the read/write ports being connected to the interface ports to form a plurality of ranks, said fault countermeasure taking method comprising:

a redundancy group allocating step of allocating a plurality of disk units to each of the plurality of ranks for the storage of data, allocating a parity disk unit to the ranks, the data disk units and the parity disk unit forming, in one rank, at least one redundancy group to store a plurality of data and their parities;

a spare disk allocating step of allocating one spare disk unit to each of the plurality of ranks so that their interface port connecting positions mutually differ;

a failure detecting step of detecting a failure of an arbitrary disk unit, the read/write port of the said failed disk unit being connected to a particular interface port;

a priority allocating step of allocating a highest priority to said spare disk unit of a particular rank with respect to each of the plurality of ranks, allocating lower priorities to said spare disk units of the other ranks as alternative destinations for said spare unit, deciding which said spare disk unit should be used, and sending allocating orders to said disk units according to said decision;

a spare disk selecting step of selecting a spare disk unit having a highest priority on the basis of the allocating orders in said priority allocating step when said arbitrary disk unit fails, wherein in the case where said spare disk unit having the highest priority cannot be selected, selecting a spare disk unit of another rank having a lower priority on the basis of said allocating orders in said priority allocating step until a spare disk unit of another rank is selected, wherein further in the case where said spare disk unit of another rank also cannot be selected shifting the disk array to a degenerating mode; and a data reconstructing step of reconstructing the data of said failed disk unit into the spare disk unit selected in said spare disk selecting step.

10. A method according to claim 9, wherein in said spare disk selecting step, in the case of selecting said spare disk unit of another rank having a lower priority, logging statistical values of fault occurrence information of all of the disk units belonging to the same rank as that of said selected spare disk unit, referring to said statistical values and, when said statistical values exceed a predetermined threshold value, selecting said spare disk unit of another rank which is allocated by a further lower priority.

11. A disk array formed by a plurality of ranks each of which is constructed by connecting a plurality of disk units to each of a plurality of disk unit interface ports, each disk unit having a read/write port connected to a selected interface port, comprising:

redundancy group allocating means for allocating a plurality of disk units in the rank with respect to each of the plurality of ranks for the storage of data, allocating a parity disk unit to the ranks, the data disk units and said parity unit forming, in one rank, at least one redundancy group to store a plurality of data and their parities;

spare disk allocating means for allocating one spare disk unit to each of the plurality of ranks so that the interface port connecting positions of said spare disk units mutually differ;

priority allocating means for allocating a highest priority to said spare disk unit of a particular rank with respect to each of the plurality of ranks and allocating lower priorities to said spare disk units of the other ranks, deciding which spare disk units should be used and sending allocating orders to said disk units according to said decision;

spare disk selecting means for selecting a spare disk unit having the highest priority on the basis of the allocating orders of said allocating means when an arbitrary disk unit fails; wherein in the case where said spare disk unit having the highest priority cannot be selected, selecting a spare disk unit of another rank having a lower priority on the basis of the allocating orders in said priority allocating step until a spare disk unit of another rank is selected, wherein further in the case where a spare disk unit of another rank also cannot be selected, shifting the disk array to a degenerating mode and data reconstructing means for reconstructing the data of said failed disk unit into the spare disk unit selected by said spare disk selecting means.

12. A disk array according to claim 11, wherein in the case of selecting said spare disk unit of another rank having a lower priority on the basis of the allocating order of said priority allocating means, said spare disk selecting means logs statistical values of fault occurrence information of all of the disk units belonging to the same rank as that of said selected spare disk unit, refers to said statistical values and selects said spare disk unit of another rank allocated at a further lower priority in the case where said statistical value exceeds a predetermined threshold value.

* * * * *